United States Patent [19]

Olschewski et al.

[11] 4,428,472

[45] Jan. 31, 1984

[54] SLIDING SLEEVE FOR CLUTCH THROW-OUT

[75] Inventors: Armin Olschewski, Schweinfurt; Manfred Brandenstein, Eussenheim; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 233,452

[22] Filed: Feb. 11, 1981

[30] Foreign Application Priority Data

Feb. 22, 1980 [DE] Fed. Rep. of Germany ... 8004785[U]

[51] Int. Cl.³ .............................................. F16D 23/14
[52] U.S. Cl. ................................... 192/98; 192/110 B
[58] Field of Search ............... 192/98, 110 B; 308/233

[56] References Cited

U.S. PATENT DOCUMENTS

| 3,882,979 | 5/1975 | Limbacher et al. | 192/98 |
| 3,963,106 | 6/1976 | Ernst et al. | 192/98 |
| 4,125,181 | 11/1978 | Stenzinger | 192/98 |
| 4,143,748 | 3/1979 | Maucher | 192/98 |
| 4,306,641 | 12/1981 | Olschewski et al. | 192/98 |

FOREIGN PATENT DOCUMENTS 2255505  7/1975  France ................. 308/233

*Primary Examiner*—Rodney H. Bonck
*Attorney, Agent, or Firm*—Daniel M. Rosen

[57] ABSTRACT

A sliding sleeve for a clutch throw-out wherein the clutch lever pressure plate is axially and circumferentially fixed on the hub element on one side by a plurality of protrusions formed on that side of the plate and engageable on the hub element, and on the other side by a shoulder machined in the hub element.

6 Claims, 4 Drawing Figures

4,428,472

SLIDING SLEEVE FOR CLUTCH THROW-OUT

BACKGROUND OF THE INVENTION

The present invention relates to motor vehicle clutches and more particularly to a sliding sleeve for a clutch throw-out.

DESCRIPTION OF THE PRIOR ART

There are already known sliding sleeves in which the hub element may be made of a material such as sheet metal, and in which the connection of the pressure plate with the hub element is effected by means of a positive lock. Such sliding sleeves are relatively expensive, because fastening the pressure plate to the hub element requires additional processing steps that are relatively expensive.

Furthermore, it is known to manufacture a hub element, provided with a radial flange, out of light metal, and to equip that hub element, in the area of the zones of contact with the actuating element, with a steel-sheet sleeve that is U-shaped in cross section. In this known design, the clutch thrust-bearing abuts directly against the soft light-metal flange of the hub element, so that the abutting surface of the flange is subject to a relatively high wear.

It is therefore the object of the present invention to provide a sliding sleeve which may be manufactured in a simple manner, with low weight, with low-wear abutting surfaces for the actuating lever of the clutch and for the clutch thrust-bearing, and which is secured against twisting of the stationary bearing ring, in relation to the sliding sleeve.

BRIEF DESCRIPTION OF THE PRESENT INVENTION

The foregoing objects are achieved in accordance with the present invention, wherein a motor vehicle clutch is provided with a hub element and a pressure plate connected with the hub element. The pressure plate is provided with abutting surfaces for a self-centering clutch thrust-bearing and for the actuating lever of the clutch. The pressure plate is maintained in an axial direction, on the side facing the clutch thrust-bearing, solely by a plurality (preferably four) of protrusions of the hub element. These protrusions run radially outward from the hub element. As a result, there remains a relatively high abutting surface for the clutch thrust-bearing, so that the surface pressure is low. The radial protrusions also serve to secure against twisting of the stationary bearing ring. In addition, the protrusions have abutting surfaces for the radially directed tongues of the damping ring, and as a result the ring provides a damping of the bearing motions in a circumferential and radial direction.

The lugs, arranged diametrically on the cylindrical surface of the pressure plate, provide for relatively high, low-wear abutting surfaces for the actuating lever of the clutch.

By means of the recesses provided, by way of example, on the pressure plate, the pressure plate is secured against twisting on the hub element caused by the hub material flowing in during casting.

In accordance with a further characteristic of the present invention, the pressure plate is provided with axially-directed projections, on the side facing the clutch thrust-bearing, which projections are surrounded by radially-directed protrusions of the hub element, and which engage with substantial clearance in recesses of the stationary bearing ring. As a result, during extremely large rotary movements of the clutch thrust-bearing, sharp shocks of the stationary bearing ring against the radial protrusions of the hub element are prevented. Abutting surfaces are adapted to contact the spring-action tongues of a damping ring, which tongues abut with a certain clearance. These abutting surfaces are arranged on the radially-directed protrusions of the hub element. As a result, a simple damping of the clutch thrust-bearing, in both the radial and the circumferential direction, is realized without impeding the centering motion of the clutch thrust-bearing.

An example of a preferred embodiment of the invention is described in more detail below, taken in conjunction with the attached drawings, wherein:

DETAILED DESCRIPTION OF THE PRESENT INVENTION

Figure 1:
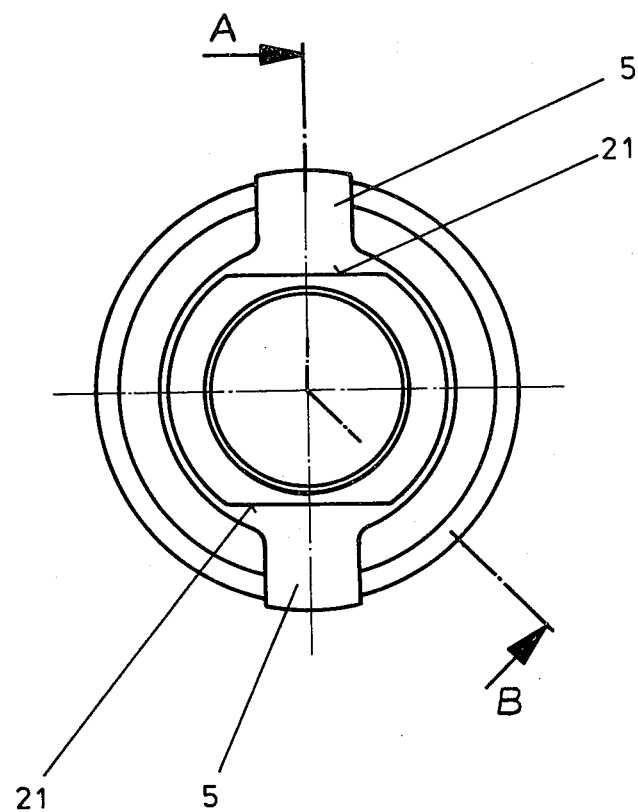
FIG. 1 shows one lateral view of a clutch throw-out, with a sliding sleeve, in accordance with the invention.
Figure 2:
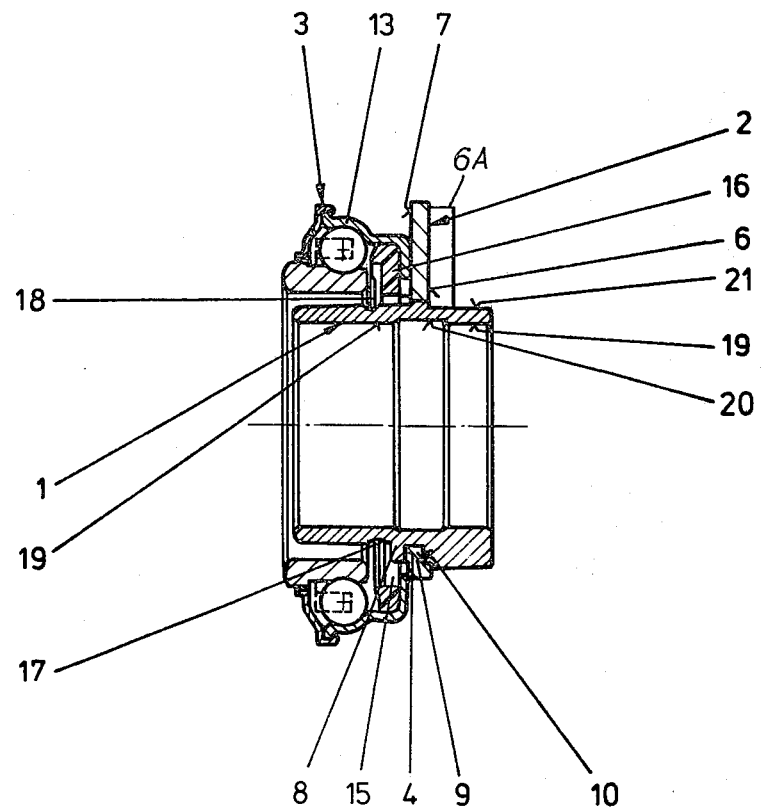
FIG. 2 is a Section A-B of the clutch throw-out shown in FIG. 1.
Figure 3:
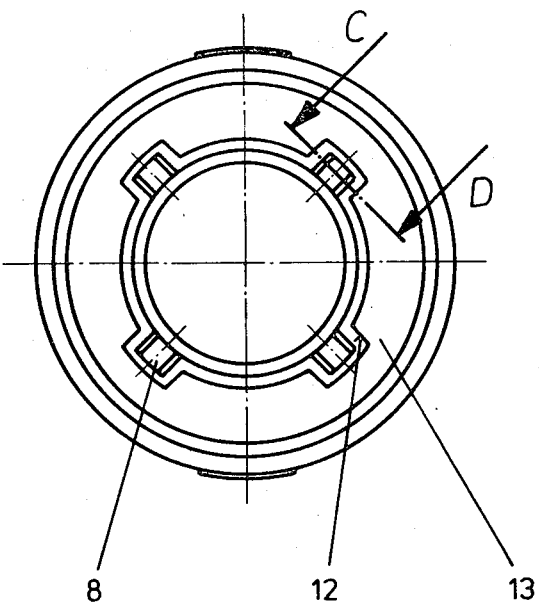
FIG. 3 depicts another lateral view of the clutch throw-out, with the outer ring of the clutch thrust-bearing abutting against the pressure plate.

The sliding sleeve in the clutch throw-out represented in FIGS. 1 to 3 includes a hub element 1, which may be made of light-metal, such as a plastic or similar material, and a pressure plate 2 connected to the hub element. On the pressure plate side facing the clutch, in a radially shiftable manner, is a clutch thrust-bearing 3. Several projections 4 are formed axially out of the pressure plate. At the cylindrical surface of the pressure plate 2 are two lugs 5 arranged in a diametrically opposed manner, these lugs featuring abutting surfaces 6 for accomodating the actuating lever 6A of the clutch. Hub element 1 may be produced by injection molding, and the pressure plate 2 inserted in the injection mold (not shown), before casting, in a manner such that the projections 4 are located on the side of the abutting surfaces 7 for clutch pressure-bearing 3. The pressure plate 2 is axially fixed on the hub element 1, in the direction of the clutch by nesting the projections 4 into a plurality, e.g. four, of radially-directed protrusions 8, formed on the hub element 1, and which are distributed uniformly around the hub element circumference. In the other axial direction, pressure plate 2 abuts against a protrusion 9 of hub element 1. The pressure plate 2 is secured against twisting in circumferential direction by the pressure plate axial projections 4, which are surrounded by the radial protrusions 8 of hub element 1, and by the recesses 10 on the other side of pressure plate 2, in which recesses the hub material flows, when the mold is being filled. Due to the fact that pressure plate 2 is axially fixed at a few points of the circumference, a low-wear, large abutting surface 7 is created for the clutch thrust-bearing 3, with a relatively low surface pressure.

Figure 4:
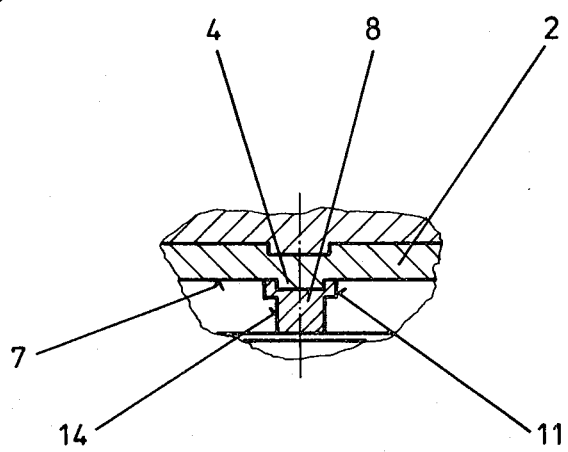
FIG. 4 shows a partial section C-D of the clutch throw-out in accordance with FIG. 3.

The axial projections 4 of pressure plate 2 are surrounded by the radial protrusions 8 of hub element 1 and, as can be seen in FIG. 4, the protrusions 8 are designed to be tee-shaped in cross section. Surfaces 11 of protrusions 8 serve as end stops in the case of large motions of clutch thrust-bearing 3 in the circumferential direction. The surfaces 12 of stationary bearing ring 13 come to abut against surfaces 11 of protrusions 8, which protrusions consist of a relatively soft material, thus preventing sharp shocks against bearing ring 13. Abutting against each of surfaces 14 of protrusions 8, with a relatively small clearance, is a radially-directed, spring-action tongue 15 of a damping ring 16. This damping ring 16 is arranged in the bore of stationary bearing ring 13, in a manner such that larger motions of the clutch bearing, in a circumferential and radial direction, are dampened, but the centering motion of clutch bearing 3 is not impeded.

A rotary annular groove 17 is turned, e.g., on a lathe, on the cylindrical surface of hub element 1. In the annular groove there is a snap ring 18, axially fastening the clutch thrust-bearing 3 to the damping ring 16. In the bore, hub element 1 features two guide surfaces 19, separated underneath the pressure plate 2 by a cut-out 20, which may be turned on a lathe, 20. On the side facing away from the clutch hub element 1 there are two surfaces 21 that run parallel to one another, on which surfaces the actuating lever of the clutch is pushed on, until abutting against surfaces 6 of lugs 5.

The present invention is not limited to the example of the embodiment described. Within the framework of the concept of the invention, various additions, deletions and modifications are possible within the province of the skilled artisan. Thus, for instance, instead of a snap ring 18, a Belleville spring or the like may be employed, such spring pushing the clutch thrust-bearing 3 against the abutting surface 7 of pressure plate 2. Other variations will be equally apparent.

What is claimed is:

1. In a sliding sleeve for a clutch release including a hub element with a cylindrical surface, a pressure plate connected to said hub element, said pressure plate having abutting surfaces for a self-centering clutch thrust-bearing and for an actuating lever of the clutch; the improvement wherein said hub element has a plurality of radially extending protrusions spaced about its circumference, said pressure plate surrounding the cylindrical surface of said hub element, the side of said pressure plate facing said actuating lever abutting a shoulder of said hub element, the side of said pressure plate facing said clutch thrust-bearing axially abutting said protrusions, said protrusions having abutting surfaces positioned to circumferentially engage a bearing ring of said bearing.

2. The sliding sleeve of claim 1 wherein said protrusions are made with a tee-shaped cross-section the protrusions having circumferentially extending members.

3. The sliding sleeve of claim 1 wherein said protrusions are provided with abutting surfaces adapted to abut against tongues of a damping ring surrounding said sleeve, said tongues having a spring action.

4. The sliding sleeve of claim 1 wherein said pressure plate includes a pair of diametrically opposed lugs, said lugs being arranged with abutting surfaces for abutting said actuating lever.

5. The sliding sleeve of claim 1 wherein said pressure plate is provided with recesses on the sides facing said actuating lever.

6. The sliding sleeve of claim 1 wherein said pressure plate includes, on the side facing said clutch thrust-bearing, a plurality of axially directed projections, which projections are surrounded by said protrusions.

* * * * *